Figure 3:
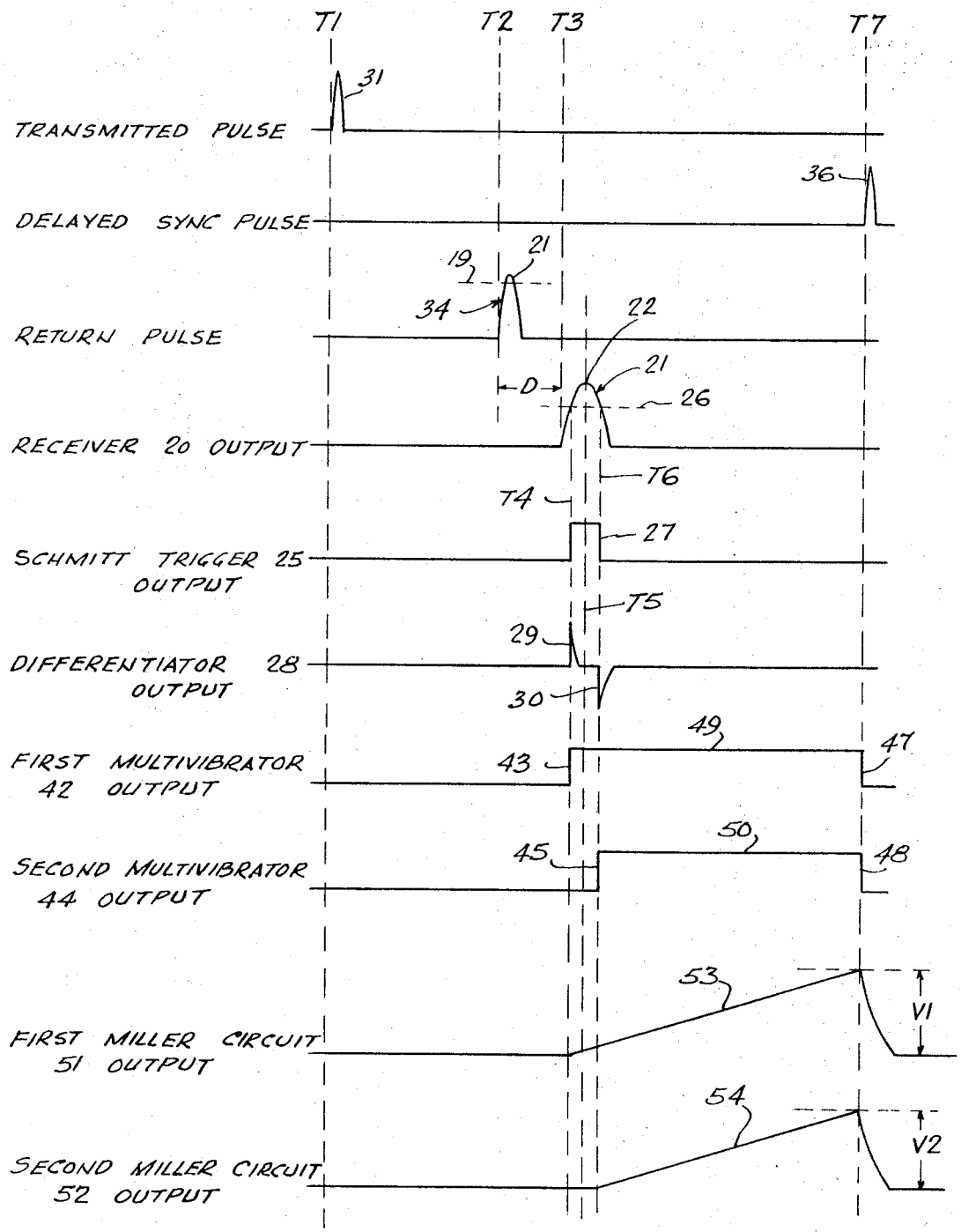

United States Patent

[11] 3,573,825

[72] Inventor Ray L. Westby
 Ottawa, Ontario, Canada
[21] Appl. No. 832,227
[22] Filed June 11, 1969
[45] Patented Apr. 6, 1971
[73] Assignee Canadian Patents and Development Limited
 Ottawa, Ontario, Canada

[54] RADAR SYSTEM
 8 Claims, 3 Drawing Figs.
[52] U.S. Cl. ..................................... 343/13, 343/12
[51] Int. Cl. ..................................... G01s 9/20
[50] Field of Search ........................... 343/12 (A), 13

[56] References Cited
UNITED STATES PATENTS
3,097,355  7/1963  Hobrough et al. ............ 343/13X Primary Examiner—Richard A. Farley
Assistant Examiner—T. H. Tubbesing
Attorney—Stevens, Davis, Miller & Mosher ABSTRACT: A high-accuracy radar altimeter which measures the average height above sloping ground by use of a circuit sensitive to the timing of the mean peak of each return pulse while eliminating the effect of signals reflected from vegetation. Verification of the receipt of a return pulse is achieved by use of Miller circuits which are triggered on by a return pulse and off by a delayed sample of the corresponding transmitted pulse.

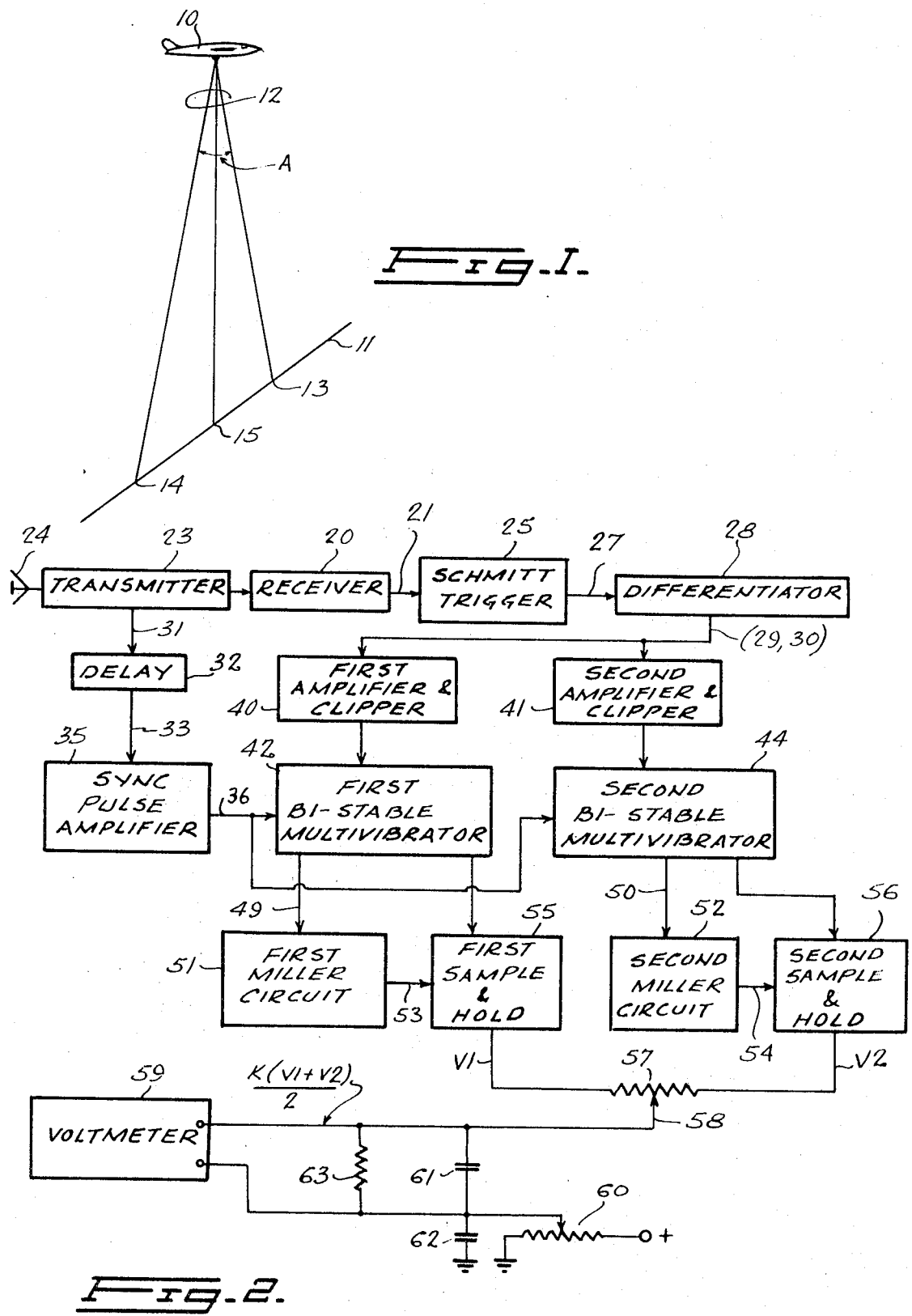

RADAR SYSTEM

This invention relates to improvements in a radar system primarily for use as an altimeter.

The present inventor's U.S. Pat. No. 3,366,956 issued Jan. 30, 1968 describes a radar system for use as an altimeter of high accuracy, which is especially useful in the making of large scale topographic and contour maps, as well as for aerial surveys generally, and especially those directed towards the assessment of forest inventories.

At the frequencies that it is convenient to use (for reasons discussed in said prior patent), namely the range of 2,000 to 4,800 MHz., energy reflected by vegetation on the ground is sufficient to influence the received signals. When an accuracy of the order of 5 feet is being sought, signals received from vegetation on the ground, particularly from tree tops, can represent a serious error. For this reason one of the purposes of the radar system described in said prior patent was to provide a method of ignoring the trees and other vegetation and obtaining an altitude reading representative of the true height of the aircraft above the ground proper.

The electrical effect of the vegetation will be that, even with very sharp edged outgoing pulses from the transmitter, the reflected pulses received will tend to be noticeably less sharp. The foot of the leading edge of each return pulse will tend to represent a reflection from the tree tops, while the peak of the leading edge of the return pulse will tend more closely to represent a reflection from the ground proper. For this reason, said prior patent was directed towards a system in which the receiver would sense the timing of the leading edge of each return pulse near its peak, rather than at its foot, thus obtaining a closer approximation to the distance of the ground proper. This prior system works satisfactorily on flat ground, but a further complication is introduced if the ground being surveyed is sloping, because the width of the return pulse is then substantially increased as a result of the varying distance from the antenna of the various sections of the ground by which the pulses are reflected, the transmitted beam necessarily having some spread by the time it reaches the ground. In these circumstances, to measure the timing of the peak of the leading edge of a return pulse as the prior system does, while avoiding complications from the foliage, tends to give a reading that is low, because this peak of the leading edge represents a reflection from the higher portions of the ground area under survey. What is desired is an average value of the height above the ground area within the transmitted beam, and electrically this is more closely represented by the mean of the peak of the return pulse rather than by the leading edge of such peak.

It is thus an object of the present invention to provide a radar system including means for responding to the mean peak of each return pulse.

Another object is to provide a simplification in the system, that is applicable to operation over flat or sloping ground, or even with other targets. This feature relates to the manner of ensuring that the timing circuit is only actuated for each transmitted pulse, if a corresponding return pulse is received. In the prior patent referred to, this result is achieved by a gate circuit that only allows a signal corresponding to the emitted pulse to trigger on the timing circuit after a return pulse has been received. A delayed version of the return pulse subsequently triggers the timing circuit off. According to the present system, the need for such a gate circuit is entirely eliminated by a reversal of the triggering functions. The return pulse is used to trigger the timing circuit on, and a relatively long delayed version of the transmitted pulse is used to trigger it off. The result is an output signal that must be subtracted from a constant in order to yield a final output signal that is directly proportional to the time lapse between the true transmitted pulse and the return pulse, i.e. directly proportional to the distance being measured, e.g. the altitude of the antenna, if airborne, or whatever other purpose the radar system is being used for.

These and other features of the present invention will be more fully and clearly understood from the specific description that follows, such description providing merely an example of the present invention, the broad scope of which is defined in the appended claims. The specific description should be read with the accompanying drawings, in which:

FIG. 1 is a diagram illustrating the problem;
FIG. 2 is a block circuit diagram of a radar system according to the invention; and
FIG. 3 is a pulse diagram.

FIG. 1 shows an aircraft 10 flying over a section of sloping ground 11. The transmitted radar beam 12 will have an included angle A, the size of this angle having been greatly exaggerated in FIG. 1 for the purposes of illustration. It will be apparent that energy will be reflected from all points between points 13 and 14 on the ground, whereas the altitude reading desired should correspond to the mean point 15, which will be represented by the mean peak of the return pulses.

The aforesaid prior patent describes a receiver circuit in which the top portions only of the return pulses are selected for measurement. This is to eliminate the foot of the leading edge of each pulse and concentrate on the peak of the leading edge, and hence largely eliminate interference from foliage. The manner of operation of such receiver circuit is explained in detail in said prior patent in connection with FIGS. 1 and 2 thereof, and the pulse forms are shown in FIG. 7 of such patent. A similar receiver will be used as the receiver 20 shown in the circuit of FIG. 2 of the present application, and it is believed unnecessary to repeat the disclosure of the prior patent in the present application. Suffice to point out that the signal S5 shown in FIG. 7 of the prior patent as the output from the receiver, which signal is an amplified version of the peak only of a return pulse, is sharp. Now assume that the aircraft 10 is flying over inclined ground as shown in FIG. 1 of the present application. The signal 21 (FIG. 3) corresponding to the peak only of a return pulse 34 (i.e. above the line 19) will no longer be nearly so sharp, and will be more of the rounded form shown in FIG. 3 of the present application. The object of the present circuit is to achieve a close approximation to an accurate timing of the mean peak 22 of such signal 21.

The transmitter 23 is conventional, and may for example be similar to that shown as the transmitter A in FIG. 1 of said prior patent. Each return pulse received at the antenna 24 will be diverted to the receiver 20 by a conventional three-port circulator in the transmitter 23. The signal 21 from the receiver 20 is passed to a conventional Schmitt trigger 25 that is set to trigger at the level shown at 26 in FIG. 3. The resulting output from the Schmitt trigger 25 is the square waveform shown at 27. This output 27 is passed to a conventional differentiator 28 to generate two signals 29 and 30 having sharp leading edges occurring at times T4 and T6 respectively. The average of these times, i.e. T5 is the basis for the required final output, it being assumed that the pulse 21 is symmetrical above the line 26 and therefore that the peak 22 occurs at time T5.

FIG. 3 shows a transmitted pulse 31 at time T1. A sample of this pulse 31 is passed to a conventional delay 32, the output 33 (FIG. 2) of which is amplified in a sync pulse amplifier 35 to generate a delayed sync pulse 36 shown in FIG. 3 as occurring at time T7. The amount of this delay will be adjusted to be greater than the maximum operating range for which the equipment is set. For example, if the radar system is set for operation within the range of 1,000 to 2,000 feet, which would be a typical range required in practice, the time interval T4 minus T1 might correspond to a height of say 2,500 feet. Obviously, to change the range, it will only be necessary to change the constants of the circuits, including this delay.

The actual return pulse 34 is shown arriving at time T2, corresponding for example to approximately 1,000 feet. There will be a delay D in the receiver 20, as part of the circuit that selects the peak of the pulse, the pulse 21 being shown as commencing at time T3. The delay D can typically correspond to 250 feet.

The positive and negative output signals 29 and 30 of the differentiator 28 are fed to a pair of conventional amplifier and clipper circuits 40 and 41 that are respectively set to respond to the positive or the negative signal. The first amplifier and clipper circuit 40 feeds to a first bistable multivibrator 42, serving to turn on such multivibrator as indicated at 43 in FIG. 3. The second amplifier and clipper circuit 41 which is sensitive to the negative-going pulse 30 turns on a second bistable multivibrator 44 as indicated at 45, the time difference between pulse edges 44 and 45 representing the difference between times $T4$ and $T6$. Both bistable multivibrators are turned off by the signal 36 coming from the sync pulse amplifier 35, as indicated in FIG. 3 at 47 and 48. It will be apparent that the output signals 49 and 50 from the respective bistable multivibrators, which signals are fed to respective Miller circuits 51 and 52 differ in length by the time difference $T6-T4$.

The Miller circuits are conventional timing circuits, and generate linearly increasing voltages 53 and 54 respectively The first voltage 53 reaches a level of $V1$ before being discharged by the trailing edge 47 of the multivibrator output 49, and the second voltage 54 reaches a lower level of $V2$ before being similarly discharged. The outputs of the Miller circuits are fed to respective sample and hold circuits 55 and 56 which are adapted each to sample a respective voltage $V1$ or $V2$ and store the information. These sample and hold circuits charge immediately to the voltage peak of each Miller circuit output, the pulse repetition frequency being, for example, of the order of 2,000. The sample and hold circuits 55, 56 also receive constant amplitude pulses from the respective multivibrators to turn on the circuits when sample pulses are available. The first and second outputs from the respective sample and hold circuits are steady voltages $V1$ and $V2$ (although varying, of course, continuously as the ground contour changes), which voltages are applied to opposite ends of a resistor 57, a center tap 58 of which is connected to one terminal of a voltmeter 59. The other terminal of the voltmeter 59 is connected to an adjustable positive voltage derived from a resistor 60. Capacitors 61 and 62 an a high resistance 63 are included in the circuit to smooth out the output of the timing circuits. Sample and hold circuits are well known but it may be mentioned that one form of sample and hold circuit that can conveniently be used in the present system is described in an article by Bert Pearl entitled "Sample-Hold Circuit" printed on page 121 et seq. of the Dec. 1966 issue of the magazine EEE published by the Mactier Publishing Corporation.

It will be apparent that the voltage tapped off from the resistor 57 will be proportional to the mean of voltages $V1$ and $V2$. This mean output signal will be $K/2 (V1+V2)$, where $K$ is a circuit constant. This mean output signal is thus proportional to the time difference $T7-T5$. Since $T7-T1$ is a known constant, the voltmeter 59 can be made direct reading in altitude, to correspond to the elapsed time $T5-T1$, which is the information desired. The mean output signal at tap 58 is inverted, in the sense that a lower value of this signal represents an increased altitude. By making the voltage derived from the resistor 60 greater than the mean of $V1$ and $V2$, a final output signal directly proportional to the altitude is represented by the voltage across the input terminals of the voltmeter 59.

Another respect in which the present circuit represents an improvement over the system described in said prior patent resides in the use of parts of a return pulse 21 to trigger the Miller timing circuits on and a delayed transmitter pulse 36 to trigger them off. This is the reverse of the system adopted in the prior patent in which a Miller circuit is triggered on by a delayed transmitted pulse and then off by a delayed return pulse. With the latter arrangement it is necessary to provide a gate circuit, or equivalent, that waits to determine that a return pulse is in fact received before it allows the Miller circuit to be triggered on by a delayed sample of the transmitted pulse. If this were not done, the Miller circuit might be triggered on by a sample of the transmitted pulse, but not shut off again, if no corresponding return pulse were ever received. The presently described system avoids the need for such a gate circuit by triggering the Miller circuits on by the return pulse, and hence not affecting them all if there is no return pulse, in which case they wait in their off condition for the next cycle. They are then triggered off (if indeed they were ever triggered on) by the delayed sample of the transmitted pulse, referred to above as the delayed sync pulse. The result is a useful simplification of the circuit.

I claim:

1. A radar altimeter for accurate determination of mean height above sloping ground, comprising:
   a. a radar transmitter including an antenna for directing outgoing pulses downwardly from an aircraft to said ground;
   b. receiving means for detecting return pulses less sharp that the outgoing pulses, the timing of the mean peak of each of which return pulses represents said mean height;
   c. means connected to said receiving means for detecting occurrence of a predetermined signal level on the leading edge of each return pulse and for generating a first timing signal upon detection of such level, said means connected to said receiving means also detecting the occurrence of the same predetermined signal level on the trailing edge of each return pulse and generating a second timing signal upon detection of such trailing edge level;
   d. means connected to said transmitter for sampling each outgoing pulse and generating a sync pulse having a predetermined temporal relationship to the leading edge of such outgoing pulse; and
   e. timing circuit means for generating a mean output signal proportional to the time interval between occurrence of said sync pulse and the mean of the times of occurrence of said first and second timing signals, said mean output signal being representative of said mean height.

2. A radar altimeter according to claim 1, wherein said predetermined signal level is located near the top of each return pulse whereby to minimize the effect of energy reflected by vegetation on the ground and thus to obtain a determination of the mean height above the ground proper.

3. A radar altimeter according to claim 1, wherein said means for generating a sync pulse includes delay means for ensuring occurrence of said sync pulse later than said first and second timing signals whereby said timing circuit means is triggered on by first and second timing signals consequent upon receipt of a return pulse, and is triggered off by said sync pulse, said time interval thus varying inversely with said mean height.

4. A radar altimeter according to claim 1, wherein said timing circuit means comprises:
   i. a first timing circuit connected to be triggered on by said first timing signal;
   ii. a second timing circuit connected to be triggered on by said second timing signal;
   iii. said means for generating a sync pulse including delay means for ensuring occurrence of said sync pulse later than said first and second timing signals;
   iv. means connecting both said timing circuits to be triggered off by said sync pulse;
   v. said timing circuits generating first and second outputs respectively proportional to the time interval between the first timing signal and the sync pulse and the time interval between the second timing signal and the sync pulse; and
   vi. means for averaging said first and second outputs to generate said mean output signal.

5. A radar altimeter according to claim 4, including means for subtracting said mean output signal from a constant to generate a final output signal directly proportional to said mean height.

6. A radar system corresponding:
   a. a radar transmitter including an antenna for directing outgoing pulses;
   b. receiving means connected to said antenna for detecting return pulses and generating at least one timing signal upon detection of each such return pulse;
   c. means connected to said transmitter for sampling each outgoing pulse and generating a delayed sync pulse having a predetermined temporal relationship to the leading edge of said outgoing pulse, the delay being such as to ensure occurrence of said sync pulse later than said timing signal; and d. timing circuit means connected to be triggered on by said timing signal and subsequently to be triggered off by said sync pulse for generating an output proportional to the time interval between said signals.

7. A radar system according to claim 6:

e. wherein said receiving means includes means for generating two said timing signals in response to detection of predetermined signal levels on the leading and trailing edges respectively of a said return pulse;

f. said timing circuit means comprising first and second timing circuits connected to be triggered on by respective said timing signals and both to be triggered off by said sync pulse;

g. said timing circuits generating first and second outputs respectively proportional to the time interval between the first timing signal and the sync pulse and between the second timing signal and the sync pulse; and h. means for averaging said first and second outputs to generate a mean output signal.

8. A radar system according to claim 7, including means for subtracting said mean output signal from a constant to generate a final output signal directly proportional to the distance of the object reflecting the return pulses to the system.